Dec. 27, 1938.   C. M. PIGLIA   2,141,485
PLANT·COVER SETTER
Original Filed Sept. 10, 1936

INVENTOR:
CHARLES M. PIGLIA
BY
ATTORNEY.

Patented Dec. 27, 1938

2,141,485

UNITED STATES PATENT OFFICE 2,141,485

PLANT COVER SETTER

Charles M. Piglia, Los Angeles, Calif., assignor to Plant Protectors, Inc., Los Angeles, Calif., a corporation of Delaware Application September 10, 1936, Serial No. 100,060
Renewed May 20, 1938

5 Claims. (Cl. 47—28)

This invention relates to the handling of plant covers and more particularly to a plant cover setter for use in picking up an individual plant cover and setting this in place in the earth over a young plant.

While the plant cover setter of my invention is adapted to be made in many different shapes for use with many different types of plant covers, it is particularly suited for use in setting a plant cover which was invented by me and which is disclosed in my copending application for U. S. Letters Patent filed on September 10, 1936 Serial No. 100,059.

It is an object of my invention to provide an improved plant cover setter which is especially adapted for setting my aforesaid novel plant cover.

It is another object of my invention to provide a plant cover setter which is capable of being manipulated and a single plant cover picked up, handled, and set down by the use of only one hand.

The manner of accomplishing the foregoing objects, as well as further objects and advantages, will be made manifest in the following description taken in connection with the accompanying drawing, in which.

Figure 1:
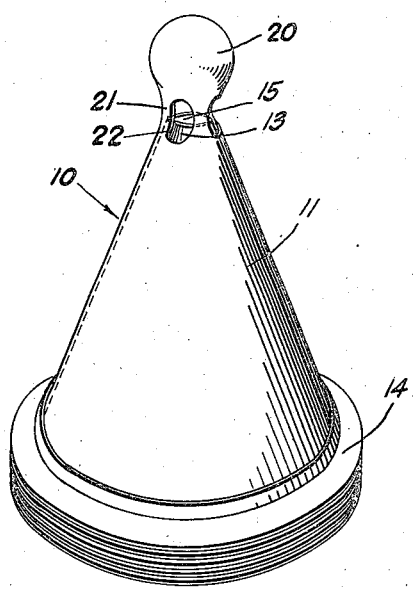
Fig. 1 is a perspective view of a preferred embodiment of the plant cover setter of my invention applied over the uppermost of a stack of my plant covers identified hereinabove.
Figure 2:
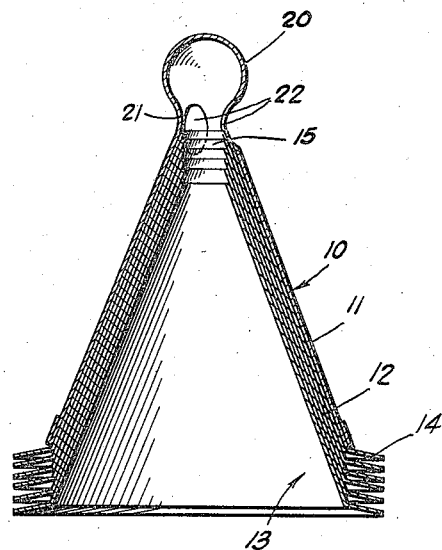
Fig. 2 is a cross sectional view of Fig. 1.

I shall now refer specifically to the drawing in which I have shown a preferred embodiment 10 of the plant cover setter of my invention. This comprises a shell 11 which may be conical or any other concave shape, but whatever shape it has it is preferably made to fit snugly the outside of the main body 12 of a plant cover 13. In the drawing I have shown the setter 10 made to fit the conical body of my plant cover identified hereinabove as being disclosed in a copending application. The plant cover 13 has an earth anchor flange 14 and an upper ventilating mouth portion 15.

Figure 3:
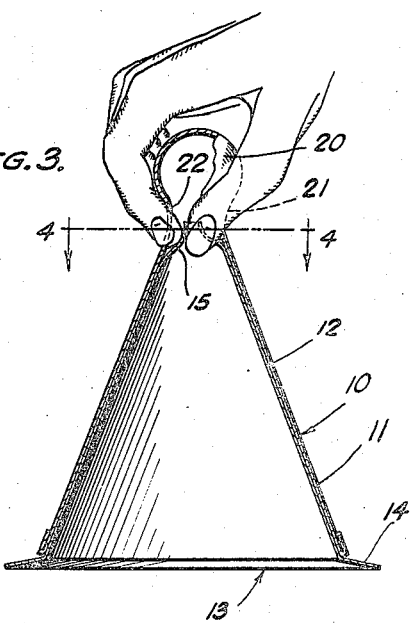
Fig. 3 is a cross sectional view of the plant cover setter of my invention being utilized by a single hand of an operator to lift and handle a single plant cover.
Figure 4:
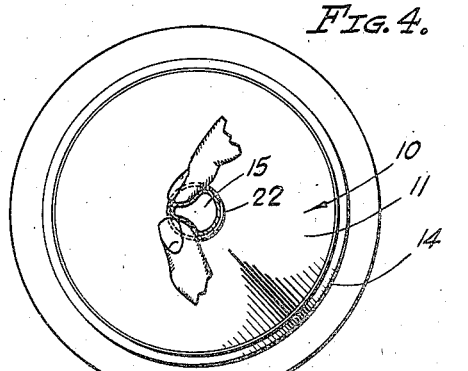
Fig. 4 is a horizontal sectional view taken on the line 4—4 of Fig. 3.

The setter 10 has a knob 20 which is connected to the shell 11 by a neck 21, the latter being provided with finger openings 22. While three of the openings are shown in the neck 21 (see Fig. 4), these openings may be fewer in number providing they provide space for the fingers of a hand to enter and grasp the portion 15 of the uppermost plant cover disposed within the setter 10 so that with the same hand the operator may grasp the knob 20 and lift the setter and, by pinching inwardly in the holes 22 with his fingers, grasp the uppermost plant cover as shown in Fig. 3 so as to transfer this inside the setter to a location where it is desired to anchor this in the ground.

To accomplish the latter function the operator lowers the setter with the knob 20 encircled by the fingers of the hand and the cover 12 grasped between the ends of two or more fingers extended inwardly through the holes 22 until the flange 14 of the cover comes to rest on the ground surrounding a plant which it is desired to protect with the cover 13. Dirt is then shifted over the flange 14 to anchor this in the earth after which the worker, who released his grasp on the cover when the latter touched the ground, now seizes the knob 20 and lifts the setter 10 upwardly leaving the plant cover in its permanent location.

While I have shown but a single form of my invention it is to be understood that various changes and modifications may be made in this without departing from the spirit of the invention or the scope of the appended claims.

What I claim is:—

1. In a plant setter, the combination of: a shell shaped to substantially fit the outer surface of a plant cover, and a knob provided on said shell just above the position of an upper portion of said plant cover when said setter is resting downwardly upon said plant cover, and having opening means provided in said setter adjacent said upper portion of said plant cover to permit said upper portion of said plant cover to be grasped by the fingers of the operator's hand while said knob is held within the palm of the same hand so that said plant setter may be lifted and supported with said plant cover suspended therein by the use of only a single hand.

2. A combination as in claim 1 in which said setter is connected to said knob by a neck and in which said opening means comprises a plurality of holes in said neck.

3. A combination as in claim 1 in which said knob is substantially spherical in shape and is connected to said setter by a neck.

4. A combination as in claim 1 in which said knob is substantially spherical in shape and is connected to said setter by a neck and in which said opening means comprises a series of holes located about said neck.

5. A combination as in claim 1 in which said knob is substantially spherical in shape and is connected to said setter by a neck and in which said opening means comprises a series of holes symmetrically located about said neck.

CHARLES M. PIGLIA.